United States Patent
Adams et al.

(10) Patent No.: US 8,580,023 B2
(45) Date of Patent: Nov. 12, 2013

(54) RUN-SAFE FILTER SYSTEM

(75) Inventors: Mark P. Adams, Madison, WI (US);
Axel J. Dahlberg, Maplewood, MN (US); Matthew L. Schneider, Seymour, IN (US)

(73) Assignee: Cummins Filtration IP Inc., Minneapolis, MN (US)

( * ) Notice: Subject to any disclaimer, the term of this patent is extended or adjusted under 35 U.S.C. 154(b) by 239 days.

(21) Appl. No.: 13/100,478

(22) Filed: May 4, 2011

(65) Prior Publication Data
US 2011/0308395 A1 Dec. 22, 2011

Related U.S. Application Data

(60) Provisional application No. 61/355,401, filed on Jun. 16, 2010.

(51) Int. Cl.
*B01D 49/00* (2006.01)
(52) U.S. Cl.
USPC ............. 96/423; 96/414; 96/417; 96/421; 96/422; 96/424

(58) Field of Classification Search
USPC ............. 96/414, 417, 421, 422, 424, 423; 210/85, 143, 232, 90
See application file for complete search history.

(56) References Cited

U.S. PATENT DOCUMENTS

| 4,638,276 | A | * | 1/1987 | Hauk | 335/151 |
| 5,470,364 | A | * | 11/1995 | Adiletta | 55/484 |
| 6,051,144 | A | | 4/2000 | Clack et al. | |
| 6,584,768 | B1 | * | 7/2003 | Hecker et al. | 60/297 |
| 6,645,277 | B1 | * | 11/2003 | Franz et al. | 96/417 |
| 7,615,151 | B2 | | 11/2009 | Wieczorek et al. | |
| 7,850,845 | B2 | | 12/2010 | Wieczorek et al. | |
| 2006/0276120 | A1 | * | 12/2006 | Cherry et al. | 454/56 |
| 2011/0052774 | A1 | * | 3/2011 | Sajjad et al. | 426/523 |

* cited by examiner

*Primary Examiner* — Jason M Greene
*Assistant Examiner* — Karla Hawkins
(74) *Attorney, Agent, or Firm* — Andrus, Sceales, Starke & Sawall, LLP

(57) ABSTRACT

A run-safe filter system is provided for confirming installation of a qualified filter element in a housing. An electrical switch has a first electrical condition in response to a qualified filter element being installed in the housing, and a second electrical condition in response to the absence of a qualified filter element installed in the housing.

21 Claims, 3 Drawing Sheets

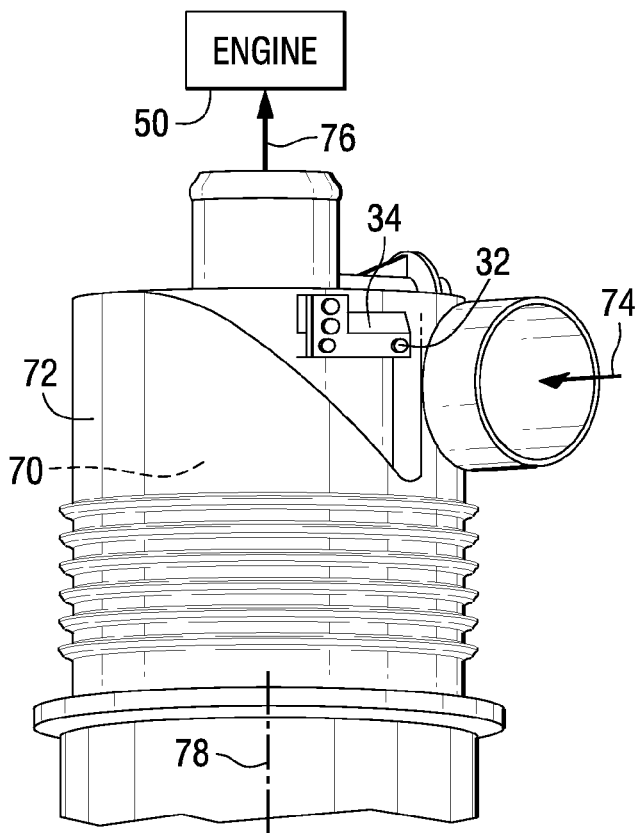
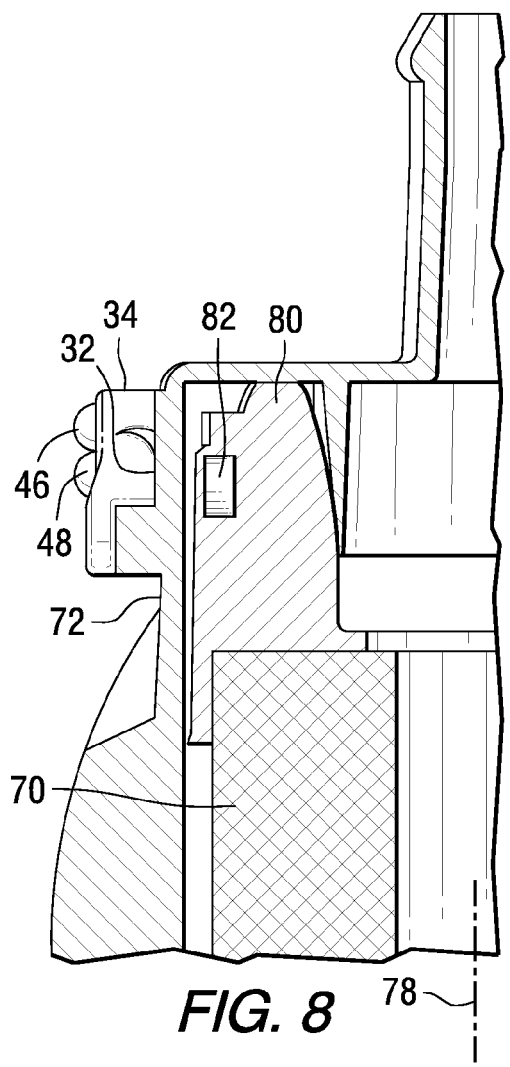
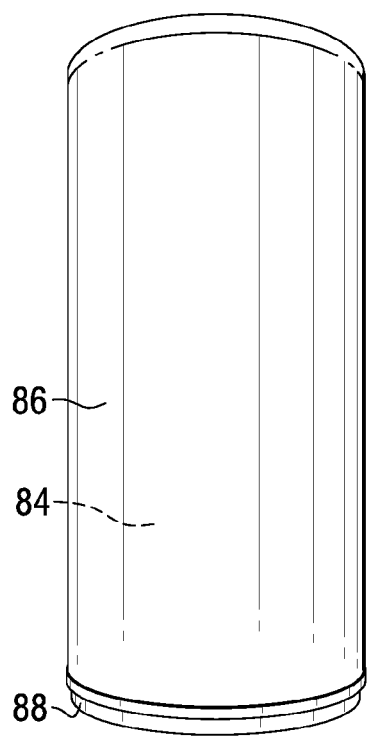
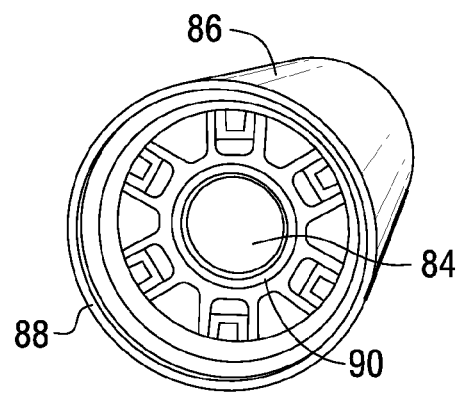
FIG. 7
FIG. 8
FIG. 9
FIG. 10

RUN-SAFE FILTER SYSTEM

CROSS-REFERENCE TO RELATED APPLICATION

This application claims the benefit of and priority from Provisional U.S. Patent Application No. 61/355,401, filed Jun. 16, 2010, incorporated herein by reference.

BACKGROUND AND SUMMARY

The invention relates to filters, and more particularly a run-safe filter system for confirming installation of a qualified filter element.

In a filter system having a filter element in a housing, it is desired to ensure that a qualified filter element is in fact installed in the housing. This assures proper filter function and performance.

The present invention arose during continuing development efforts in the above technology.

BRIEF DESCRIPTION OF THE DRAWINGS

FIG. 7 is a perspective view showing another embodiment.

FIG. 8 is an enlarged sectional view of a portion of FIG. 7.

FIG. 9 is a front view of a filter element showing a further embodiment.

FIG. 10 is a perspective view from below of the filter element of FIG. 9.

DETAILED DESCRIPTION

Figure 1:
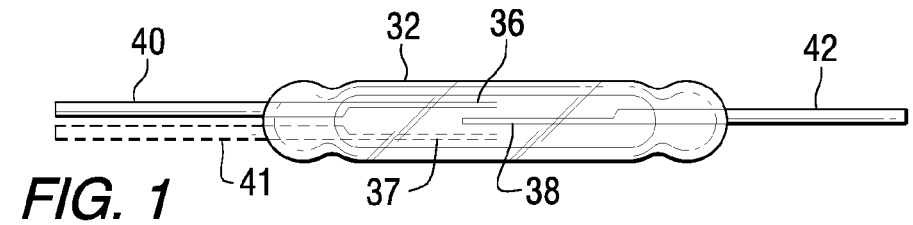
FIG. 1 is a side sectional view of an electrical switch known in the prior art.
Figure 2:
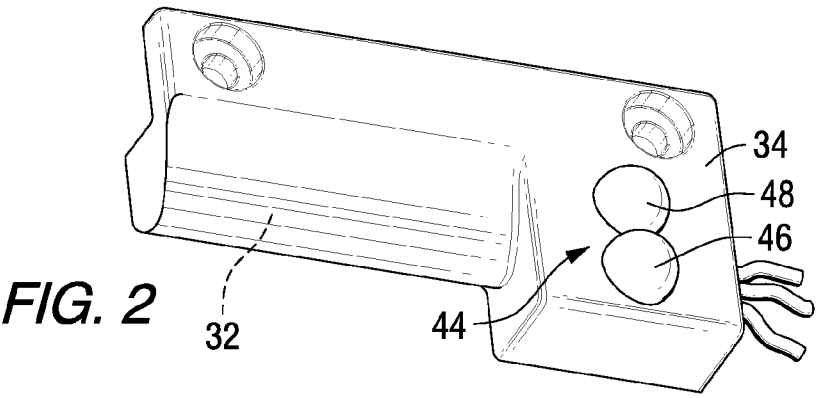
FIG. 2 is a perspective view illustrating a switch housing for the switch of FIG. 1.
Figure 3:
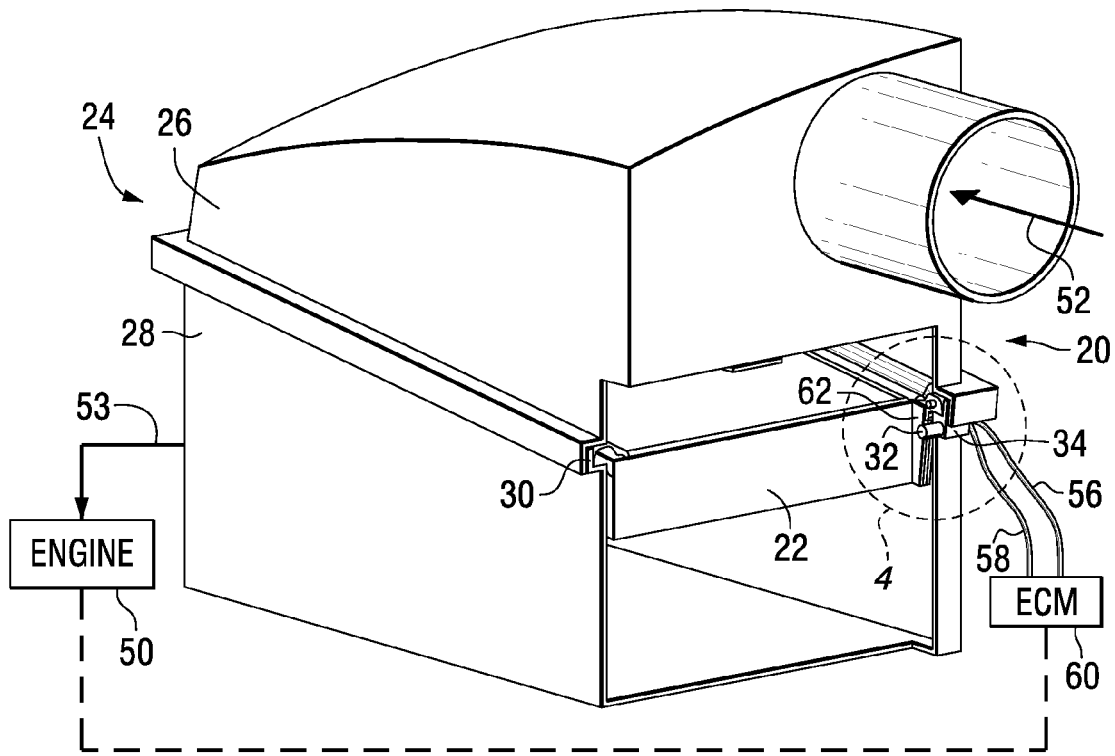
FIG. 3 is a perspective view partially cutaway of a filter housing incorporating the switch of FIG. 2.
Figure 4:
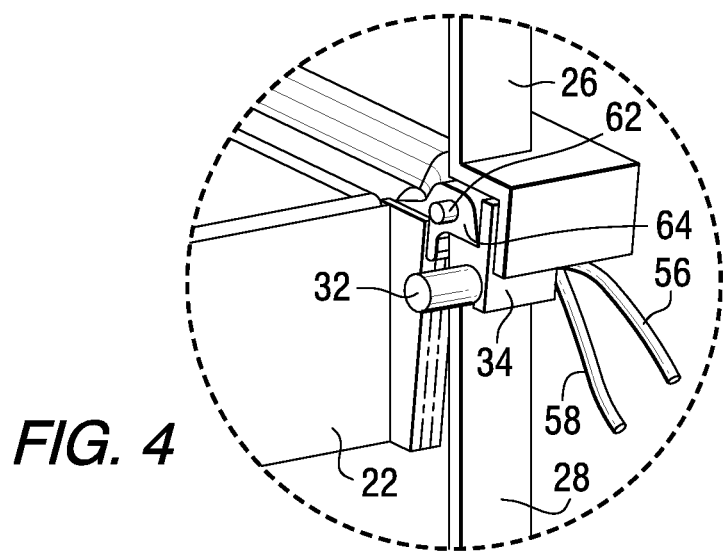
FIG. 4 is an enlarged view of a portion of FIG. 3.

The present disclosure provides a run-safe filter system 20, FIG. 3, for confirming installation of a qualified filter element 22 in a housing 24, e.g. having a cover 26 and a base 28 mounting the filter element 22 at an interface 30 therebetween. An electrical switch 32, FIG. 1, is provided in a switch housing 34, FIG. 2, mounted to the housing, e.g. at interface 30. Switch 32 in one embodiment is a reed switch, FIG. 1, though other types of switches may be used to provide the sensing function noted below. The switch has a first electrical condition, e.g. closure and contact of reeds 36 and 38 in response to magnetic field flux, to be described, in response to a qualified filter element installed in the housing. The closure of reeds 36 and 38 completes an electrical circuit through terminals 40 and 42. The switch has a second electrical condition, e.g. separation of reeds 36 and 38 as shown in FIG. 1, in response to the absence of magnetic field flux in response to the absence of a qualified filter element installed in the housing.

In one embodiment, the electrical switch is in the noted second condition in response to a non-qualified filter element installed in the housing. In another embodiment, the switch is in the noted second electrical condition in the absence of any filter element installed in the housing. In one embodiment, an indicator 44 is provided, which may be visible on switch housing 34, and is responsive to the noted first electrical condition of the switch and provides a first indication, e.g. at a green light 46 to an operator confirming installation of a qualified filter element in the housing, and is responsive to the noted second electrical condition of the switch and provides a second indication, e.g. red light 48, to the operator indicating the absence of a qualified filter element installed in the housing. In one embodiment, for the latter indication, a third reed is provided as shown in dashed line at 37 connected to a third terminal at 41, wherein reed 38 is normally biased to an at rest downward position in contact with reed 37 to thus complete an electrical circuit between terminals 41 and 42 to in turn illuminate a red light such as 48. In response to a magnetic flux field, reed 38 moves upwardly away from and out of contact with reed 37 and instead moves into electrical contact with reed 36 to complete an electrical circuit between terminals 40 and 42 to illuminate green light 46.

In one embodiment, the run-safe filter system is provided on an internal combustion engine 50, FIG. 3, wherein incoming air to the housing is shown at arrow 52, which air is filtered by filter element 22 and then supplied as shown at arrow 53 to the air induction system of engine 50. In one embodiment, electrical switch 32 in the noted second condition provides a kill signal at leads 56, 58 to an engine kill system disabling operation of the engine, e.g. providing a kill signal to the ECM 60 (electronic control module) of the engine. In another embodiment, the kill signal provides spark field grounding on spark ignition engines not equipped with an ECM. Electrical switch 32 in the noted first condition provides an enable signal at leads 56, 58 enabling operation of the engine, e.g. providing an enable signal to ECM 60.

Figure 5:
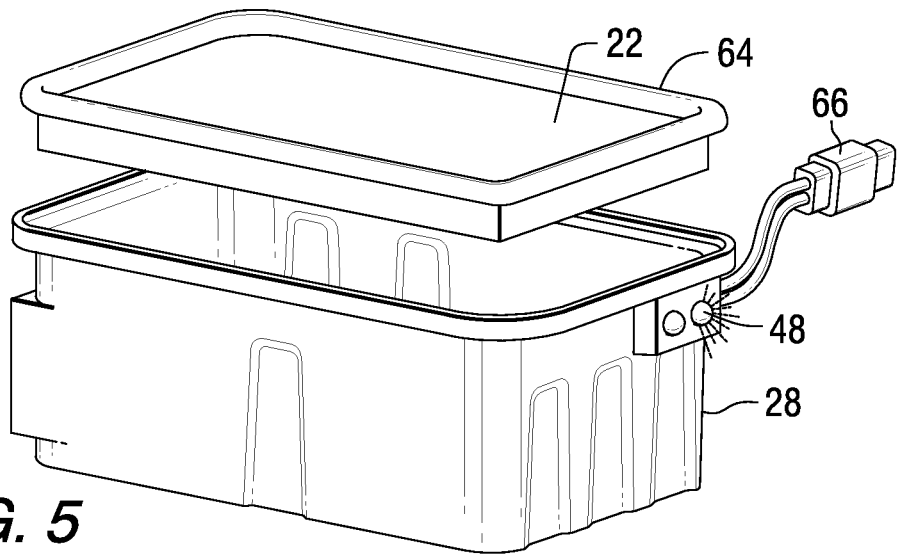
FIG. 5 is an exploded perspective view further illustrating components of FIG. 3.
Figure 6:
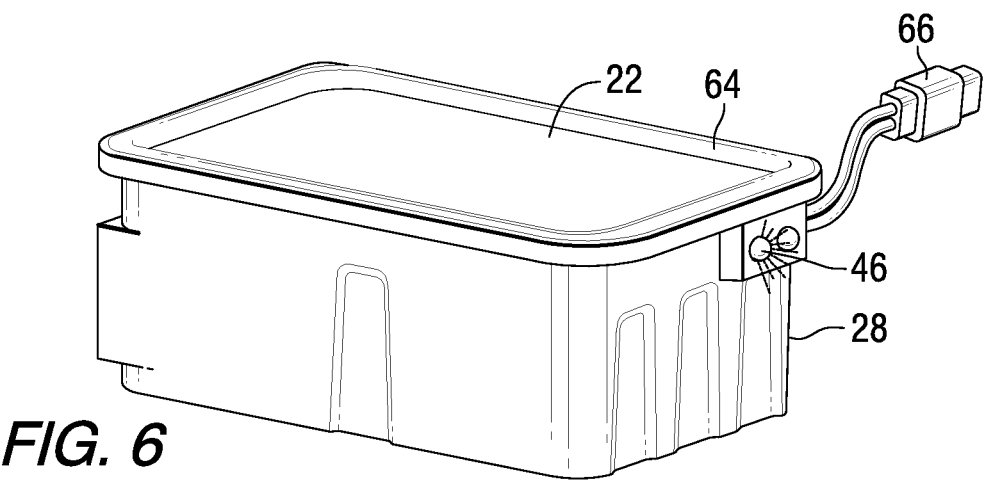
FIG. 6 is an assembled perspective view of the components of FIG. 5.

In one embodiment, with the electrical switch 32 provided by a reed switch, the qualified filter element 22 includes a designated element section 62 creating a magnetic flux field actuating reed switch 32 to the noted first condition when designated element section 62 is in given proximity to reed switch 32 upon installation of qualified filter element 22. In one embodiment, the noted designated element section 62 is a magnet. In another embodiment, the designated element section is a magnetized section. In further embodiments, qualified filter element 22 includes a gasket 64, FIGS. 4-6, for sealing to the housing, and a magnet 62 embedded in the gasket and actuating electrical switch 32 to the noted first condition upon installation of qualified filter element 22 in the housing. In the embodiment of FIGS. 3-6, qualified filter element 22 is a pannelette filter element in a rectangular housing 24. As shown in FIG. 5, red light 48 is illuminated in the absence of installation of qualified filter element 22 and/or in the absence of any filter element. As shown in FIG. 6, green light 46 is illuminated in response to qualified filter element 22 installed in the housing. In addition to or in place of leads 56, 58 being supplied to ECM 60, such leads may also be supplied to a switch control module 66 which may be interfaced to a dashboard or the like for providing the above noted indication functions.

In a further embodiment, the noted qualified filter element is an annular filter element 70 in a cylindrical housing 72, FIGS. 7, 8, receiving incoming air at 74 and discharging clean filtered air at 76, e.g. to engine 50. The annular filter element extends axially along an axis 78 to an endcap 80. A magnetic band 82 is provided at the endcap and actuates the electric switch 32 to the noted first condition upon installation of qualified filter element 70 in the housing. In one embodiment, the magnetic band is a continuous annular ring extending along a circumference along endcap 80 and circumscribing axis 78. In another embodiment, the endcap is magnetized and actuates electrical switch 32 to the noted first condition upon installation of qualified filter element 70 in the housing. In another embodiment, qualified filter element 70 is keyed to the housing such that qualified filter element 70 must be installed in a given orientation in the housing in order for switch 32 to be actuated to the noted first condition. In FIGS. 3-6, magnet 62 may be a continuous band or ring extending along a circumference along filter element 22 and/or gasket 64, or may be provided by one or more magnets in combination with a keying feature requiring that filter element 22 be keyed to the housing such that qualified filter element 22 must be installed in a given orientation in the housing in order for the electrical switch to be actuated to the noted first condition.

In the embodiment of FIGS. 9, 10, filter element 84 is provided in cylindrical spin-on canister 86 having a lower gasket 88 for mounting and sealing, e.g. to an engine block for filtering engine oil. Endplate or endcap 90 may be magnetized or may have a continuous annular magnetic band or ring or may have a plurality of magnets spaced therearound, one of which will align with or be in close enough proximity to electrical switch 32 to actuate it to the noted first condition upon installation and tightening of filter canister 86.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation. The noted qualified filter element is selected from the group of air, liquid, and engine exhaust filter elements.

What is claimed is:

1. A run-safe filter system for confirming installation of a qualified filter element in a housing, comprising an electrical switch, said switch having a first electrical condition in response to a qualified filter element installed in said housing, said switch having a second electrical condition in response to the absence of a qualified filter element installed in said housing, an actuator actuating said electrical switch between said first and second electrical conditions, wherein said switch is mounted to said housing, and said actuator is mounted to said qualified filter element, wherein said actuator actuates said switch to said first electrical condition when said qualified filter element is installed in said housing in a position bringing said actuator into actuating proximity to said electrical switch, and wherein said qualified filter element comprises a gasket for sealing to said housing, and said actuator comprises a magnet embedded in said gasket and actuating said electrical switch to said first condition upon said installation of said qualified filter element in said housing.

2. The run-safe filter system according to claim 1 wherein said electrical switch is in second condition in response to a non-qualified filter element installed in said housing.

3. The run-safe filter system according to claim 1 wherein said switch is in said second electrical condition in the absence of any filter element installed in said housing.

4. The run-safe filter system according to claim 1 comprising an indicator responsive to said first electrical condition of said switch and providing a first indication to an operator confirming installation of said qualified filter element in said housing, and responsive to said second electrical condition of said switch and providing a second indication to said operator indicating the absence of a qualified filter element installed in said housing.

5. The run-safe filter system according to claim 1 wherein:
said run-safe filter system is on an internal combustion engine;
said electrical switch in said second condition provides a kill signal to an engine kill system disabling operation of said engine;
said electrical switch in said first condition provides an enable signal enabling operation of said engine.

6. The run-safe filter system according to claim 1 wherein said electrical switch comprises a reed switch.

7. The run-safe filter system according to claim 1 wherein said qualified filter element is a pannelette filter element in a rectangular said housing.

8. The run-safe filter system according to claim 1 wherein said qualified filter element is an annular filter element in a cylindrical said housing.

9. The run-safe filter system according to claim 1 wherein said qualified filter element is keyed to said housing such that said qualified filter element must be installed in a given orientation in said housing for said switch to be actuated to said first condition.

10. The run-safe filter system according to claim 1 wherein said qualified filter element is selected from the group consisting of air, liquid, and engine exhaust filter elements.

11. A run-safe filter system for confirming installation of a qualified filter element in a housing, comprising an electrical switch, said switch having, a first electrical condition in response to a qualified filter element installed in said housing, said switch having a second electrical condition in response to the absence of a qualified filter element installed in said housing, an actuator actuating said electrical switch between said first and second electrical conditions, wherein said switch is mounted to said housing, and said actuator is mounted to said qualified titter element, wherein said actuator actuates said switch to said first electrical condition when said qualified filter element is installed in said housing in a position bringing said actuator into actuating proximity to said electrical switch, and wherein said qualified filter element comprises an endcap that is magnetized or that comprises a magnetic band, and said actuator comprises said endcap actuating said electrical switch to said first condition upon said installation of said qualified filter element in said housing.

12. The run-safe filter system according to claim 11 wherein said electrical switch is in second condition in response to a non-qualified filter element installed in said housing.

13. The run-safe filter system according to claim 11 wherein said switch is in said second electrical condition in the absence of any filter element installed in said housing.

14. The run-safe filter system according to claim 11 comprising an indicator responsive to said first electrical condition of said switch and providing a first indication to an operator confirming installation of said qualified filter element in said housing, and responsive to said second electrical condition of said switch and providing a. second indication to said operator indicating the absence of a qualified filter element installed in said housing.

15. The rim-safe filter system according to claim 11 wherein:
said run-safe filter system is on an internal combustion engine;
said electrical switch in said second condition provides a kill signal to an engine kill system disabling operation of said engine;

said electrical switch in said first condition provides an enable signal enabling operation of said engine.

16. The run-safe filter system according to claim 11 wherein said electrical switch comprises a reed switch.

17. The run-safe filter system according to claim 11 wherein said qualified filter element is a pannelette filter element in a rectangular said housing.

18. The run-safe filter system according to claim 11 wherein said qualified filter element is an annular filter element in a cylindrical said housing.

19. The run-safe filter system according to claim 11 wherein said magnetic band is a continuous band extending along. a circumference along said endcap and circumscribing said axis.

20. The run-safe filter system according to claim 11 wherein said qualified filter element is keyed to said housing such that said qualified filter element must be installed in a given orientation in said housing for said switch to be actuated to said first condition.

21. The run-safe filter system according to claim 11 wherein said qualified filter element is selected from the group consisting of air, liquid, and engine exhaust filter elements.

* * * * *

UNITED STATES PATENT AND TRADEMARK OFFICE
CERTIFICATE OF CORRECTION

PATENT NO. : 8,580,023 B2  
APPLICATION NO. : 13/100478  
DATED : November 12, 2013  
INVENTOR(S) : Mark P. Adams Page 1 of 1

It is certified that error appears in the above-identified patent and that said Letters Patent is hereby corrected as shown below:

In the Claims

Column 4, Claim 11, Line 37, "titter" should be -- filter --.

Signed and Sealed this  
Thirteenth Day of May, 2014

Michelle K. Lee  
*Deputy Director of the United States Patent and Trademark Office*